United States Patent [19]

Nagahara

[11] Patent Number: 4,481,769
[45] Date of Patent: Nov. 13, 1984

[54] CONTROL SYSTEM FOR HYDRAULICALLY DRIVEN VEHICLES

[75] Inventor: Yoshikazu Nagahara, Yokohama, Japan

[73] Assignee: Kabushiki Kaisha Komatsu Seisakusho, Tokyo, Japan

[21] Appl. No.: 332,734

[22] Filed: Dec. 21, 1981

[30] Foreign Application Priority Data

Dec. 24, 1980 [JP] Japan .................... 55-184666[U]

[51] Int. Cl.³ ............... F16H 39/04; F16H 39/46
[52] U.S. Cl. ............................. 60/441; 60/442; 60/445; 60/451
[58] Field of Search ............ 60/435, 441, 442, 436, 60/445, 450, 451, 460, 468, 489, 490, 493, 494; 180/307; 91/506

[56] References Cited

U.S. PATENT DOCUMENTS 3,411,297 11/1968 Hann ....................... 60/445 X
3,734,225 5/1973 Kobald et al. ................ 180/307

FOREIGN PATENT DOCUMENTS 142105 11/1980 Japan ...................... 60/442

OTHER PUBLICATIONS (New Product Introduction), Ebara Compact Two-Speed Change-Over Hydraulic Motor TOM170VS₂.

Primary Examiner—Irwin C. Cohen
Attorney, Agent, or Firm—Armstrong, Nikaido, Marmelstein & Kubovcik

[57] ABSTRACT

A control system for a hydraulically driven vehicle having a variable displacement hydraulic motor connected with a variable displacement hydraulic pump in a closed loop and driven thereby.

A spring-applied and fluid-released brake is mounted on an output shaft of the motor. A regulator is operatively connected to the motor for controlling the displacement thereof in response to a fluid pressure at both ports thereof. When fluid pressure at either one of the ports of the motor exceeds a predetermined level, the variable displacement motor is changed over to a high displacement position thereby generating a large braking force when the vehicle is to be stopped.

2 Claims, 1 Drawing Figure

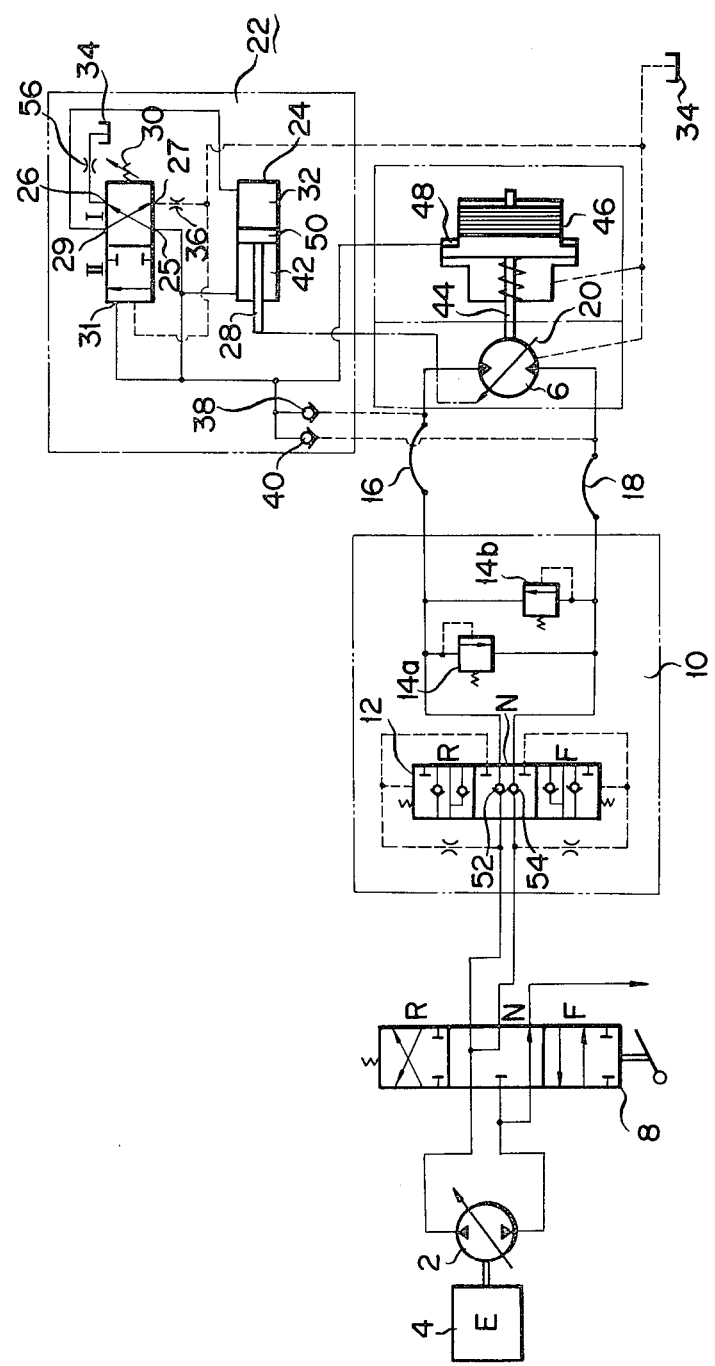

CONTROL SYSTEM FOR HYDRAULICALLY DRIVEN VEHICLES

BACKGROUND OF THE INVENTION

This invention relates to a control system for hydraulically driven vehicles and in particular to a control system in which the displacement of a variable displacement hydraulic motor is automatically changed in response to a higher fluid pressure at both ports thereof.

A hydraulically driven vehicle generally includes a pair of variable displacement hydraulic pumps each driven by a common engine and a pair of variable displacement hydraulic motors each connected with the respective pumps in a closed loop and driven thereby. A control system has been known for such a hydraulically driven vehicle in which vehicle speed can be varied in two stages by controlling the angle of each swash plate of the respective motors by regulators.

In this system, however, because fluid which operates the regulators is introduced therein from a conduit on the upstream side of a brake valve disposed in the respective closed loops, it is difficult to obtain enough braking force when the vehicle is to be stopped since the variable displacement hydraulic motors are changed over to their low displacement positions at that time.

SUMMARY OF THE INVENTION

It is therefore an object of the present invention to provide a control system for a hydraulically driven vehicle which overcomes the above noted problems of the prior art.

Another object of the present invention is to provide a control system for a hydraulically driven vehicle which can generate an enough braking force at the time of stopping the vehicle.

A further object of the present invention is to provide a control system for a hydraulically driven vehicle which can offer two drive ratios by employing variable displacement hydraulic motors.

In accordance with an aspect of the present invention, there is provided a control system for a hydraulically driven vehicle, comprising: a variable displacement hydraulic pump driven by a prime mover; a variable displacement hydraulic motor connected with said variable displacement hydraulic pump in a closed loop and driven thereby, said hydraulic motor having an output shaft connected thereto and being adapted to be changed over between a low displacement position and a high displacement position; manually operated valve means disposed in the closed loop for controlling forward and reverse rotation of said hydraulic motor; brake valve means disposed in the closed loop between said manually operated valve means and said hydraulic motor, said brake valve means being connected with said hydraulic motor through first and second conduits forming a part of the closed loop; regulator means for controlling the displacement of said variable displacement hydraulic motor in such a manner that said hydraulic motor is changed over to the high displacement position when fluid pressure in either of said first and second conduits exceeds a predetermined level and said hydraulic motor is changed over to the low displacement position when fluid pressure in either of said first and second conduits is lower than said predetermined level, said regulator means being connected with said first and second conduits through first and second check valves, respectively; and spring-applied and fluid-released brake means mounted on said output shaft, said brake means being connected with said first and second conduits through said first and second check valves, respectively.

The above and other objects, features and advantages of the present invention will be readily apparent from the following description taken in conjunction with the accompanying drawing.

BRIEF DESCRIPTION OF THE DRAWING

Attached drawing is a hydraulic circuit showing a control system for a hydraulically driven vehicle according to the present invention.

DESCRIPTION OF THE PREFERRED EMBODIMENT

The present invention will now be described in detail below with reference to the accompanying drawing.

Reference numeral 2 denotes a variable displacement hydraulic pump driven by an engine 4. Connected in a closed loop with the variable displacement hydraulic pump 2 and driven thereby is a variable displacement hydraulic motor 6. Although a common hydraulically driven vehicle generally equip a pair of closed loops, only one of which is shown and described here for the sake of simplicity.

Disposed in the closed loop are a manually operated valve 8 and a brake valve 10 which comprises a counterbalance valve 12 and crossover safety valves 14a, 14b. The manually operated valve 8 has three positions, namely neutral position N, forward position F and reverse position R. The counterbalance valve 12 has also three positions, namely neutral position N, forward position F and reverse position R. The crossover safety valves 14a and 14b are connected in parallel with the variable displacement hydraulic motor 6 in a circuit comprising conduits 16 and 18 forming a part of the above-mentioned closed loop.

The variable displacement hydraulic motor 6 can take two different displacement positions, namely low or small displacement position and high or large displacement position by changing the angle of a swash plate 20 thereof which is controlled by a regulator 22. The regulator 22 comprises a control cylinder 24 and a pilot-operated control valve 26. A piston rod 28 of the control cylinder 24 is mechanically connected to the swash plate 20 for changing the angle thereof. When the piston rod 28 is moved left in the drawing, the hydraulic motor 6 is changed over to its high displacement position and when the piston rod 28 is moved right, the hydraulic motor 6 is changed over to its low displacement position.

The pilot-operated control valve 26 has a drain position I and a communication position II and is normally held to the drain position I by the force of a spring 30 where a head-end chamber 32 of the control cylinder 24 is connected with a reservoir 34 through an orifice 36. A first port 25 of the control valve 26 is connected with the conduits 16, 18 through check valves 38, 40, respectively. A second port 27 of the control valve 26 is connected with the reservoir 34 through the orifice 36 while a third port 29 thereof is connected with the head-end chamber 32 of the control cylinder 24. A pilot port 31 of the control valve 26 is connected with the conduits 16, 18 through the check valves 38, 40, respectively. Also connected with the conduits 16, 18 through the check valves 38, 40 is a rod-end chamber 42 of the control cylinder 24.

The hydraulic motor 6 has an output shaft 44 on which a spring applied and fluid released brake 46 is mounted. A brake chamber 48 is connected with the conduits 16, 18 through the check valves 38, 40.

The operation of the above mentioned control system will be described below. Let it be assumed that fluid flow in the closed loop is counterclockwise when the engine 4 is in normal operating condition. Therefore when the manually operated valve 8 is shifted to the forward position F, the counterbalance valve 12 is also shifted to its forward position F due to pilot pressure acting thereon. Accordingly, fluid pressure in the conduit 18 becomes higher than that in the conduit 16.

Since the brake chamber 48 is in constant communication with the conduits 16 and 18 through the check valves 38 and 40, when the manually operated valve 12 is shifted to the forward position F, the brake 46 is immediately released. When fluid pressure in the conduit 18 exceeds a predetermined level, the control valve 26 is changed over to its communication position II because fluid pressure in the conduit 18 being introduced into the pilot port 31 as a pilot pressure overcomes the force of the spring 30. As a result, a part of high pressure fluid in the conduit 18 is introduced into the head-end chamber 32 of the control cylinder 24 through the control valve 26.

Since now the same fluid pressure is being introduced into both chambers 32 and 42, a piston 50 and the piston rod 28 combination is moved leftwards in the drawing due to difference in pressure receiving areas at both sides of the piston 50. As a result, the variable displacement hydraulic motor 6 is changed over to the high displacement position. In the high displacement position, the motor 6 can generate more torque than in the low displacement position.

When fluid pressure in both conduits 16 and 18 becomes lower than the predetermined level, the force of the spring 30 overcomes pilot pressure introduced into the pilot port 31 to shift the control valve 26 to its drain position I. This happens, for example, when load imposed on the output shaft 44 is eased. With the control valve 26 being in the drain position I, the head-end chamber 32 of the control cylinder 24 is connected with the reservoir 34 through the orifice 36. As a result, the piston 50 is moved rightwards thereby changing the variable displacement hydraulic motor 6 to its low displacement position. In the low displacement position, the hydraulic motor 6 generates less torque, however, the output shaft 44 rotates more rapidly than in the high displacement position. This means that the vehicle speed is faster in the low displacement position than in the high displacement position. Therefore in the control system of the present invention, the vehicle speed can be changed in two stages automatically depending on the fluid pressure in the conduits 16 and 18.

When the manually operated valve 8 is shifted to the reverse position R, the counterbalance valve 12 is also shifted to the reverse position R. As a result, fluid pressure in the conduit 16 becomes higher than that in the conduit 18 when the engine is in operation. Since the mode of operation of the regulator 22 and the associated hydraulic motor 6 in this case is the same as that in the forward position, a detailed description thereof is omitted here.

When the manually operated valve 8 is shifted to the neutral position N so as to stop the vehicle, the counterbalance valve 12 is shifted to the neutral position N as well. As a result, fluid in the conduits 16 and 18 is confined therein due to the provision of check valves 52, 54 in the neutral position of the counterbalance valve 12. Due to vehicle's inertia, therefore, fluid pressure in the conduit 16 which has been lower than that in the conduit 18 becomes higher than that in the conduit 18. This fluid pressure is introduced into the pilot port 31 of the control valve 26 through the check valve 38, thereby shifting the control valve 26 to the communication position II against the force of the spring 30 when the fluid pressure in the conduit 16 exceeds the predetermined level.

Therefore, the piston 50 is moved toward left and the variable displacement hydraulic motor 6 is changed over to the high displacement position. Since the motor 6 is functioning as a brake at this time, this means an increase in brake capacity. Accordingly, vehicle's inertia will be reduced quickly resulting in a safe stopping of the vehicle.

When the vehicle is stopped, fluid pressure in both conduits 16 and 18 becomes low enough to change over the control valve 26 to its drain position I. As a result, fluid in the brake chamber 48 is drained into the reservoir 34 through an orifice 56 and therefore the brake 46 is mechanically applied.

Although the control system of the present invention has been shown and described with reference to the particular embodiment, it is to be understood that the present invention is not to be limited thereto but is to be determined in accordance with the spirit and scope of the appended claims.

What is claimed is:

1. A control system for a hydraulically driven vehicle, comprising:

a variable displacement hydraulic pump driven by a prime mover;

a variable displacement hydraulic motor connected with said variable displacement hydraulic pump in a closed loop and driven thereby, said hydraulic motor having an ouput shaft connected thereto and being adapted to be changed over between a low displacement position and a high displacement position;

manually operated valve means disposed in the closed loop for controlling forward and reverse rotation of said hydraulic motor having a forward position, a neutral position and a reverse position;

brake valve means disposed in the closed loop between said manually operated valve means and said hydraulic motor for increasing the brake torque of said motor and for slowing said motor when said manually operated valve means is in said neutral position, said brake valve means being connected with said hydraulic motor through first and second conduits forming a part of the closed loop, said brake valve means in a neutral position thereof blocking flow from said first and second conduits to said manually operated valve means;

regulator means for controlling the displacement of said variable displacement hydraulic motor in such a manner that said hydraulic motor is changed over to the high displacement position when fluid pressure is either of said first and second conduits exceeds a predetermined level while said hydraulic motor is changed over to the low displacement position when fluid pressure in both of said first and second conduits is lower than said predetermined level, said regulator means being connected with said first and second conduits through first and second check valves, respectively; and spring-applied and fluid-released brake means mounted on said output shaft, said brake means being connected with said first and second conduits through said first and second check valves, respectively.

2. A control system for a hydraulically driven vehicle as recited in claim 1 wherein said regulator means comprises a control cylinder operatively connected to said variable displacement hydraulic motor for varying the displacement thereof, said control cylinder having formed therein a head-end chamber and a rod-end chamber which is in direct communication with said first and second conduits through said first and second check valves and, a pilot-operated control valve having a communication position where the head-end chamber of said control cylinder is communicated with said first and second conduits through said first and second check valves and a drain position where the head-end chamber of said control cylinder is communicated with a reservoir, said pilot-operated control valve being normally held in the drain position by the force of a spring whereby when the fluid pressure in either of said first and second conduits exceeds the predetermined level, said pilot-operated control valve is changed over to the communication position thereby placing said variable displacement hydraulic motor to the high displacement position.

* * * * *